United States Patent
Kitajima et al.

(10) Patent No.: US 7,026,607 B2
(45) Date of Patent: Apr. 11, 2006

(54) SCANNING PROBE MICROSCOPE

(75) Inventors: Itaru Kitajima, Chiba (JP); Masatsugu Shigeno, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 0 days.

(21) Appl. No.: 10/828,002

(22) Filed: Apr. 20, 2004

(65) Prior Publication Data

US 2004/0227076 A1 Nov. 18, 2004

(30) Foreign Application Priority Data

Apr. 21, 2003 (JP) ............................. 2003-115617

(51) Int. Cl.
- *G01N 23/00* (2006.01)
- *G21K 7/00* (2006.01)
- *H01J 3/14* (2006.01)
- *H01J 40/14* (2006.01)
- *H01J 5/16* (2006.01)

(52) U.S. Cl. ................. 250/234; 250/306; 250/462.01; 73/105

(58) Field of Classification Search ................ 250/306, 250/462.01; 73/105
See application file for complete search history.

(56) References Cited

U.S. PATENT DOCUMENTS

| | | | |
|---|---|---|---|
| 6,823,173 B1 * | 11/2004 | Srey et al. ..................... 455/59 |
| 2003/0029063 A1 * | 2/2003 | Takesada et al. ......... 40/299.01 |
| 2004/0138781 A1 * | 7/2004 | Sacks et al. ................ 700/245 |

* cited by examiner

Primary Examiner—John R. Lee
Assistant Examiner—Kalimah Fernandez
(74) Attorney, Agent, or Firm—Adams & Wilks

(57) ABSTRACT

A scanning probe microscope has a scanner and a mounting unit for supporting the scanner. An identifying mark is disposed on a part of the scanner for representing preselected information corresponding to the scanner. The mounting unit has an interpreting device for interpreting the preselected information represented by the identifying mark. A setting device sets in a controller, for controlling the scanning probe microscope, parameter information corresponding to the scanner probe microscope, parameter information corresponding interpreted by the interpreting device.

20 Claims, 5 Drawing Sheets

CONNECTOR

FIG. 5A
FIG. 5B
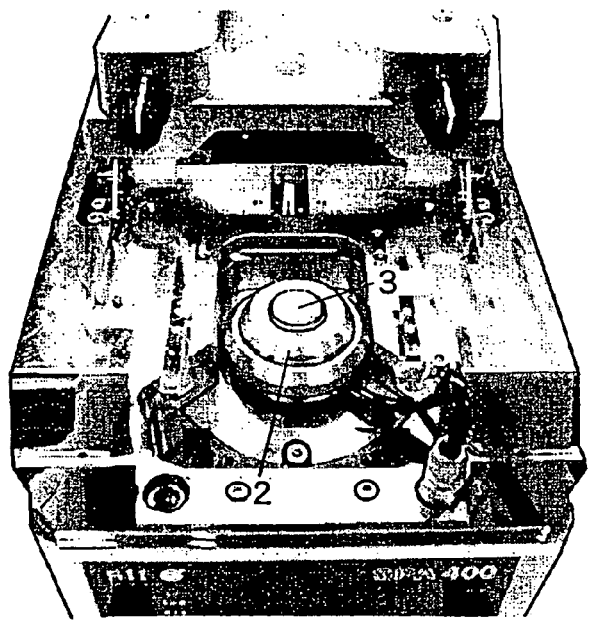
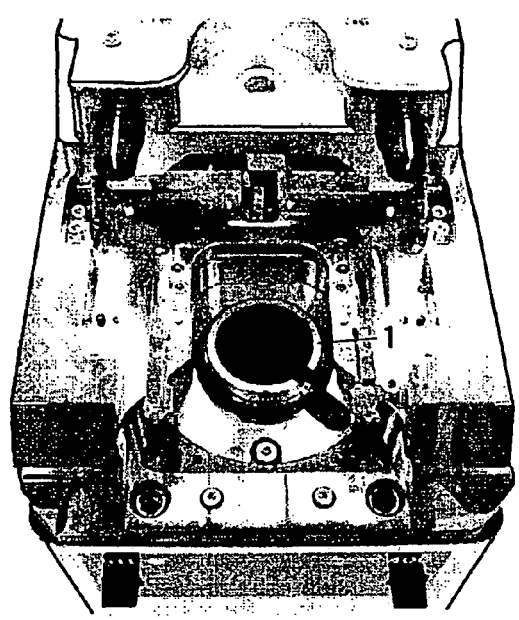

SCANNING PROBE MICROSCOPE

BACKGROUND OF THE INVENTION

1. Field of the Invention

The present invention relates to a scanning probe microscope in which characteristic information of a scanner is automatically set concurrently with replacement of the scanner.

2. Description of the Related Art

A scanning probe (SPM) is an apparatus for observing a physical quantity of a sample surface with extremely high resolution at sub-nanometer scale by scanning the sample surface with a probe having an acuminated tip end and detecting mechanical, electrical, magnetic interaction, or the like acting between a probe and the sample surface.

For example, in an atomic force microscope (AFM) as a representative SPM, using a probe unit having a microcantilever and a probe mounted on one end thereof, a force such as an atomic force acting between the probe tip end and the sample surface is detected from the change in deflection amount of the cantilever. For the detection of the change in deflection amount, for example, a system by which a voltage is applied to a piezoelectric scanner that expands and contracts in the height direction (hereinafter, referred to as "z direction") so that the deflection amount becomes constant and this applied voltage is used as a detection value, and the like is adopted. Since this voltage value cancels the height direction displacement, the voltage value corresponds to the sample surface height information in the position where the probe is opposed.

This AFM apparatus includes a scanner having a piezoelectric element, a probe unit, and a probe displacement detection unit. As a specific arrangement example, a sample is mounted on the stage to be driven and displaced by the scanner, the probe unit is set immediately above the sample surface, and the photoelectric probe displacement detection unit applying the principle of an optical lever is disposed above the probe unit, i.e., on the back face of the cantilever. Observation is performed while displacing the probe tip end and the sample relatively by allowing the scanner to perform the raster two-dimensional scanning, which is a combination of main scanning and sub-scanning, in the horizontal direction (hereinafter, referred to as XY direction). The displacement detection values are paired with the associated scanning positions of the scanner to display an image on the display and, therefore, a scanning microscope image having subnano scale resolution can be obtained.

FIG. 6 is a diagram showing a basic schematic of the conventional SPM. To a base 101, a cylindrical piezoelectric element 102 as a scanner drive unit is fixed with its central axis is made perpendicular to the base surface. A stage 103 is provided on the free end side of the cylindrical piezoelectric element 102, and a sample 104 is mounted on the stage 103. A probe unit 105 is a cantilever having an acuminated probe on the free end thereof manufactured by a silicon process, for example, in an atomic force microscope, and is disposed above the sample 104. The base 101 is fixed on a z coarse stage 106 for bringing the sample 104 surface and the probe tip end of the probe unit 105 close to each other. Above the probe unit 105, a probe displacement detection means 107 including a laser source and a photoelectric detector capable of two-dimensionally detecting a laser spot position is disposed.

The output signal of the probe displacement detection means 107 is input to a feedback circuit 108. The output of the feedback circuit 108 is an input to the cylindrical piezoelectric element 102 as a z direction drive voltage. Further, in the cylindrical piezoelectric element 102, an XY scanning signal is received from an XY scanning circuit 109, resulting in the mounted sample 104 being two-dimensionally displaced via the stage 103. The XY scanning signal from the XY scanning circuit 109 is simultaneously received by a display unit 110, and the z direction drive voltage corresponding to the detection signal is also received by the display unit 110, thereby allowing a typographic image of the sample 104 surface to be obtained (see Publication of Japanese Patent Application No. 2002-350319).

In the foregoing conventional SPM, the scanning is sometimes replaced according to use conditions. Since scanners have different characteristics from one to another, when replacing the scanner with another scanner, various parameters such as a piezoelectric constant and an nonlinear correction coefficient of the scanner should be se in a controller for controlling operation of the SPM (computer in general). Generally, there has been a problem that, since this setting is manually performed by an operator and its operation is not only complex, but also easily accompanied by errors, when the setting is erroneous, accurate measurements can not be performed. Problems such that the XY scanning is not performed in a designated manner, the z displacement amount is deviated, and the scale of the obtained microscopic image is varied have occurred.

SUMMARY OF THE INVENTION

An object of the present invention is to solve the above described problems in the conventional art, that is, to probe an SPM having a function for automatically setting the parameter information specific to a newly installed scanner in the controller, when replacing a old scanner with the new scanner, without requiring the manual calibration by the operator.

An SPM of the invention includes means for representing information regarding a scanner positioned on a part of the scanner, means for interpreting the information, and means for setting, in a controller, parameter information specific to the scanner of interest based on the interpreted information on the main body side on which the scanner is mounted.

As a specific example, the means for representing information on a scanner is a mark such as a barcode, a position of a notch or hole for identifying the scanner, the means for interpreting the information comprises mark reading means such as a barcode reader, a push pin, or a photosensor, and the means for setting, in the controller, parameter information specific to the scanner of interest based on the interpreted information includes a member for storing parameter information of the scanner identified by the mark while associating the parameter information with the mark information and for reading out the parameter information from the storage member and setting it is in the controller.

Further, as a different specific example, the means for representing information on a scanner is an IC chip or a barcode that has stored parameter information specific to the scanner of interest. The means for interpreting the information is information reading means such as a reading head or a barcode reader. The means for setting, in the controller, the parameter information specific to the scanner of interest based on the interpreted information is a means for setting the read parameter information in the controller.

As a further specific example, the SPM in which the means for representing information on a scanner comprises an IC chip having a function of wireless transmission, and in which the means for interpreting the information comprises means having a function of receiving the wireless transmitted information is proposed.

As described in the specification, the expression "main body side" is used to contrast with the scanner as a replacement member, and represents not only the SPM main body, but also the entire system including the controller etc. connected to the main body. In the specification, the expression "probe unit" includes a probe and a cantilever, "probe" is a microscopic hard part having a conical or pyramid form, and "tip end" is a point of the probe.

BRIEF DESCRIPTION OF THE DRAWINGS

FIG. 1A shows the first embodiment and FIG. 1B shows the second embodiment.

FIG. 2A shows the third embodiment and FIG. 2B shows the fourth embodiment.

FIGS. 5A and 5B show the SPM apparatus according to the invention seen from diagonally above, FIG. 5A shows a state in which the scanner is set and FIG. 5B shows a state in which the scanner is detached.

DETAILED DESCRIPTION OF THE PREFERRED EMBODIMENT

As described above, sometimes replacement of the scanners is required when the SPM is used, and parameters specific to the used scanner should be set in the controller. Conventionally, this setting is manually performed by an operator, and there has been a disadvantage that its operation is not only complex, but also accompanied by errors. In order to solve the problem, the invention has produced an idea for providing a function of automatically discriminating the kind of the scanner by the SPM itself and setting parameters specific to the scanner in the controller.

The scanner replacement is performed in the mode in which the unit for mounting the scanner is provided on the SPM main body side and the scanner to be used is selected and mounted in the mounting unit. In order to make parameters specific to the scanner to be automatically set in the controller, first, the SPM of the invention includes means for representing information on the scanner of interest in a part of the unit and means for interpreting the information on the main body side on which the scanner is mounted.

As information on the scanner of interest provided in the scanner, there are cases of parameter information specific to the scanner of interest and only ID information for identifying the scanner. The former case is a system of reading information of the scanner and setting it in the controller, and the latter case is a system of reading ID information of the scanner, reading out parameter information specific to the scanner of interest from the parameter information table specific to the respective scanners corresponding to IDs, which has been stored in the controller (computer) connected to the SPM main body or in the SPM main body, according to the read ID, and setting it in the controller.

Figure 3:
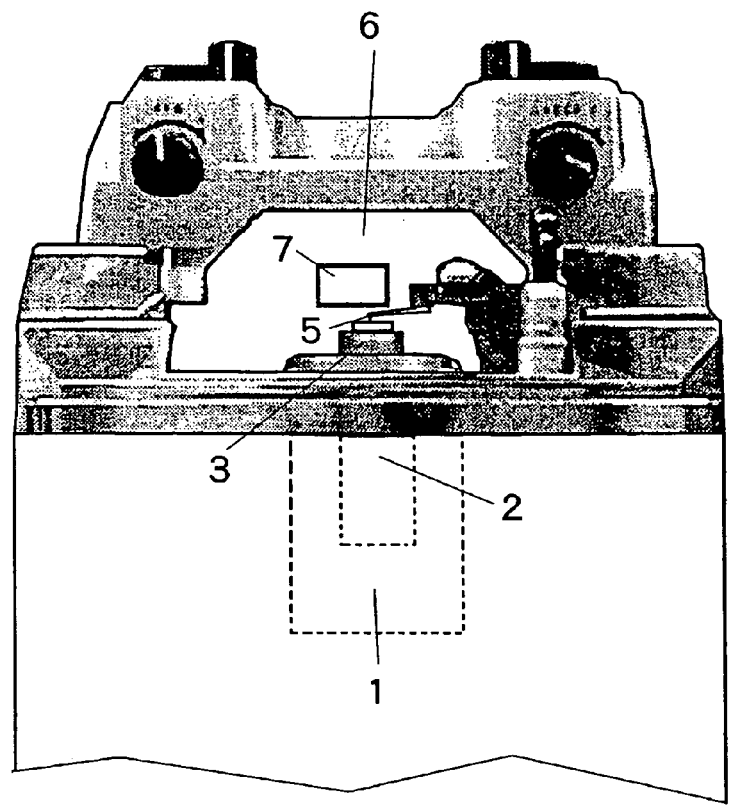
FIG. 3 shows the constitution of the main part of the SPM apparatus according to the invention.
Figure 4:
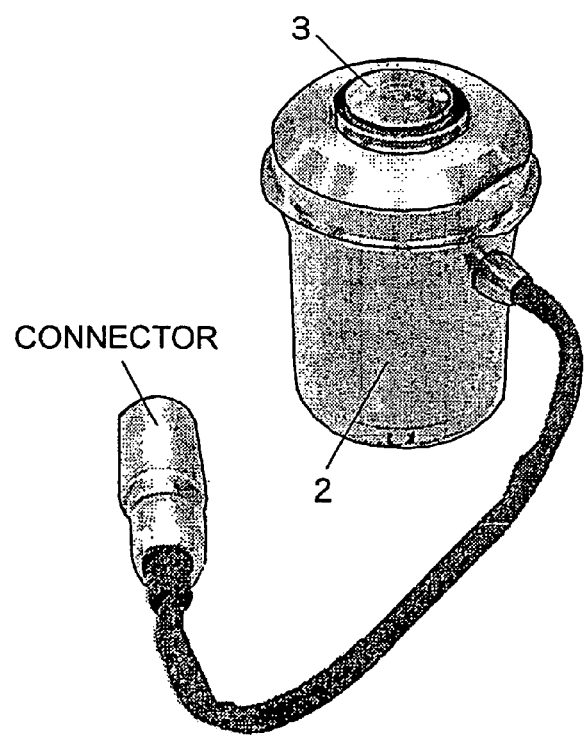
FIG. 4 shows the scanner used in the SPM apparatus according to the invention alone.
Figure 6:
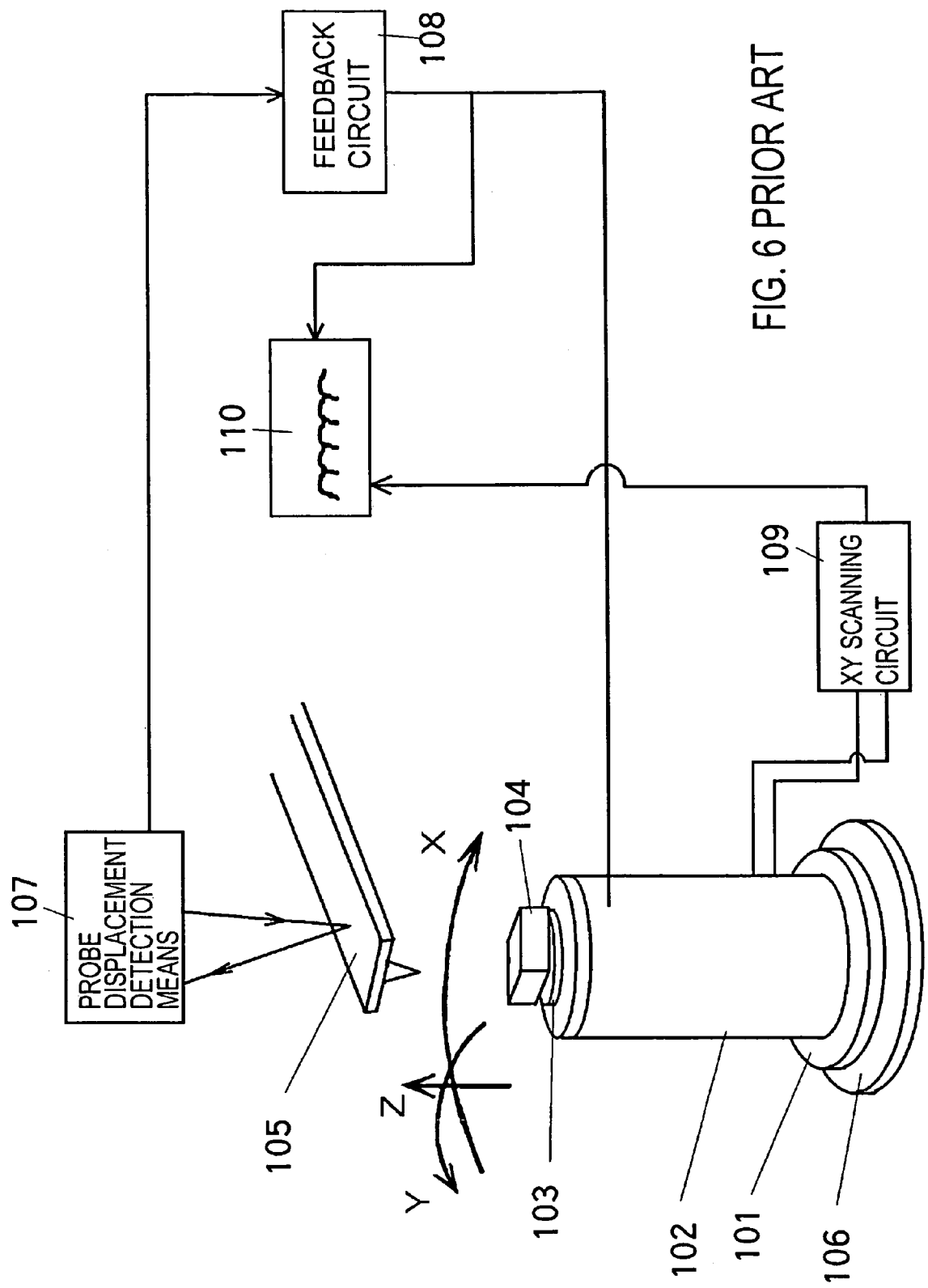
FIG. 6 shows a basic constitution of the SPM apparatus fundamental to the invention.

FIGS. 3 to 5B are views for explanation of a mode of scanner replacement in the invention. FIG. 3 shows the components of the main part of an SPM. FIG. 4 shows a scanner used in the SPM apparatus alone. FIGS. 5A and 5B show the SPM apparatus main body seen from diagonally above, with FIG. 5A showing a state in which the scanner is installed and FIG. 5B showing a state in which the scanner is detached.

As shown in FIG. 3, a measurement chamber 6 is provided in the upper part of the SPM apparatus. Within the measurement chamber 6, a stage 3 provided on the upper end of the scanner 2, a probe unit 5 provided so that the probe tip end may be opposed to the sample surface mounted on the stage 3, and a displacement sensor 7 for detecting displacement of the cantilever of the probe unit 5 are disposed. Further, below the measurement chamber 6, a mounting unit 1 in which the scanner 2 is set is disposed. The scanner 2 includes a cylindrical piezoelectric element accommodated within a cylindrical casing as shown in FIG. 4.

At the time of measurement, a suitable scanner 2 is selected according to the measurement condition to the sample, and the scanner 2 is set in the mounting unit 1 so as to make it from the state shown in FIG. 5B to the state shown in FIG. 5A. Note that, when attaching and detaching the scanner 2 as shown in FIGS. 5A and 5B, the probe unit 5, the displacement sensor 7, etc. disposed within the measurement chamber 6 are slid rearward to make space.

EMBODIMENT 1

The embodiment of the invention in which the scanner 2 that has been selected according to the sample measurement condition, replaced and set in the mounting unit 1 is automatically identified by the SPM will be described by referring to FIGS. 1A and 1B.

Figure 1A:
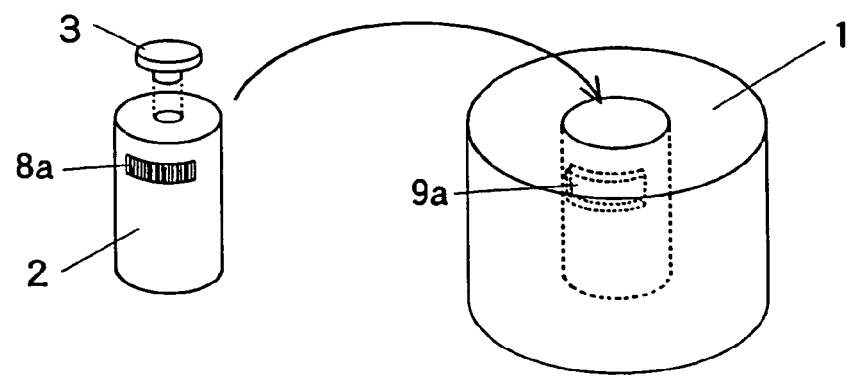
FIGS. 1A and 1B show two embodiments of the invention.

The example shown in FIG. 1A is a mode in which ID information for identifying the scanner of interest or parameter information specific to the scanner of interest is provided on the outer surface of the scanner 2 by an identifying member in the form of a barcode 8a. On the main body side, a barcode reader 9a for reading the information of the barcode 8a is provided on the wall part of the mounting unit 1. The scanner 2 has a cylindrical shape and its circumferential position is determined because the XY direction positioning is necessary when the scanner is accommodated in the mounting unit. The position where the barcode reader 9a is provided on the wall part of the mounting unit 1 is a position opposite to the barcode 8a in a state in which the scanner 2 is accurately positioned and set.

In this embodiment 1, in the case where the information of the barcode 8a is ID information for identifying the scanner of interest, a system in which parameter information specific to the respective scanners corresponding to IDs has been stored in storage means such as a ROM provided on the SPM main body side in advance, and the parameter information specific to the scanner of interest is read out according to the read ID and set in the controller is adopted. Further, in the case where the information of the barcode 8a is parameter information specific to the scanner of interest, a system in which the parameter information read out by the barcode reader 9a is set directly in the controller is adopted.

EMBODIMENT 2

Figure 1B:
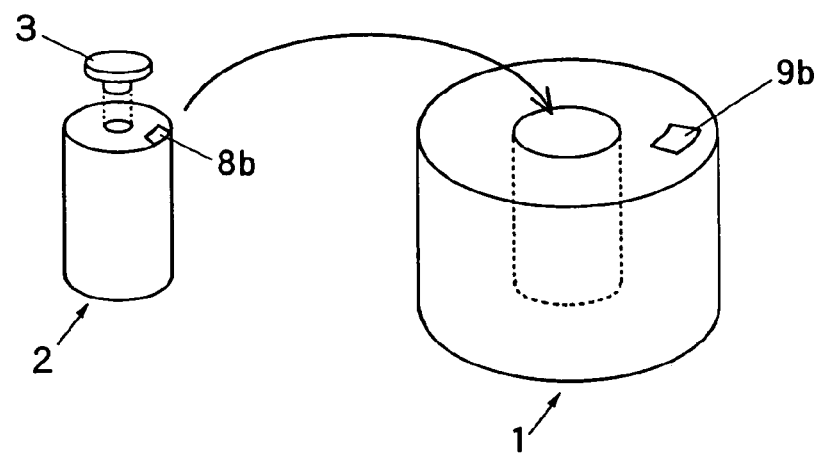

The example shown in FIG. 1B adopts a system in which a wireless IC chip 8b in which information has been stored is attached to the scanner 2 and data is received on the main body side. When the scanner 2 attached with the wireless IC chip 8b is set in the mounting unit 1, the information stored in the IC chip 8b is received by a data receiving element 9b disposed in the vicinity thereof. The stored information of this embodiment 2 may be ID information for identifying the scanner of interest or parameter information specific to the scanner of interest. However, since the capacity of the IC chip is sufficiently large, it would be more simple that the parameter information specific to the scanner of interest is directly stored because the parameter storage information of a ROM etc. is dispensed with.

As a modified example of the embodiment 2, a wired IC chip can be adopted in place of the wireless IC chip for wireless transmission. As shown in FIG. 4, since a lead line for sending a drive voltage from the main body is connected to the scanner 2, a lead line for signal transmission is easily provided.

EMBODIMENT 3

Figure 2A:
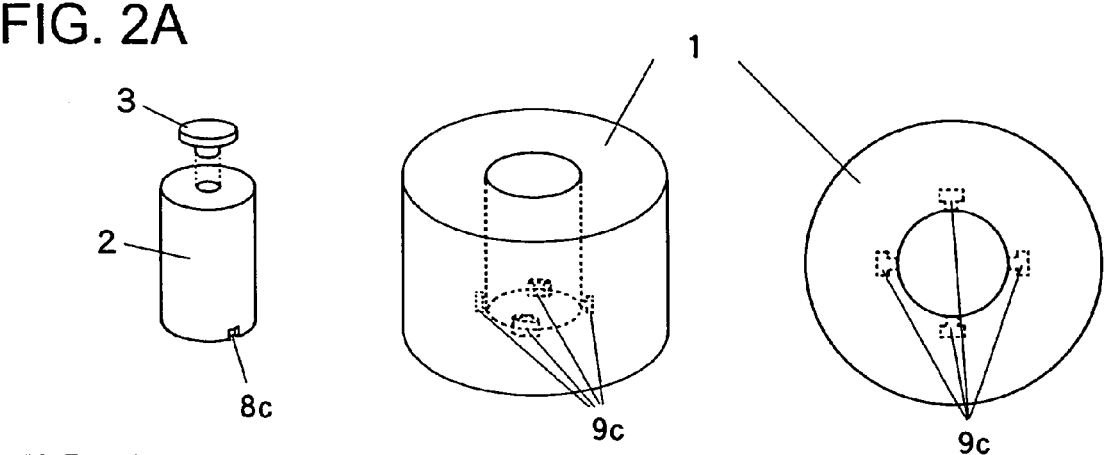
FIGS. 2A and 2B show two different embodiments of the invention.

The example shown in FIG. 2A is a system in which a notch 8c for identification is cut in the scanner 2 and ID information is stored therein. The scanner 2 is identified by detecting in which position of the scanner 2 the notch 8c is cut. In the shown example, the notch 8c is cut in the bottom rim of the scanner 2 and plural number of photo-sensors 9c are disposed on the periphery of the bottom of the mounting unit 1, and the scanner of interest is identified according to which sensor detects the notch 8c. As the photo-sensor 9c, a combination of a light source and a photodetector for receiving reflected light, and the like can be adopted. As described above, since the scanner 2 has a cylindrical shape and its circumferential position is determined because the XY direction positioning is necessary when the scanner is accommodated in the mounting unit 1, an ID can be discriminated by its circumferential position.

In the embodiment 3, the number of the photo-sensors 9c is set to four, however, not limited to that, the number of the required photo-sensors is equal to the number of the used scanners. Further, the notch 8c of the scanner 2 is not necessarily cut in the bottom rim, but maybe vertically arranged in any position without interference with other members such as electrodes. In short, an ID has only to be identified by its position. The photo-sensor 9c is disposed on the mounting unit 1 side so as to be opposed to the position of the notch 8c. In the case of the information storage mode by the notch 8c, parameter information specific to the scanner of interest can not be directly stored. On this account, a system in which parameter information specific to the respective scanners corresponding to IDs has been stored in storage means such as a ROM provided on the SPM main body side in advance, and the parameter information specific to the scanner of interest is read out according to the read ID and set in the controller is adopted.

Further, as a modified example of the embodiment 3, a system in which, for example, a black mark having different reflectance from the outer surface of the scanner casing is provided in place of the notch, and the position of the mark is discriminated by the intensity of the reflected light detected by the photo-sensor 9c may be adopted.

EMBODIMENT 4

Figure 2B:
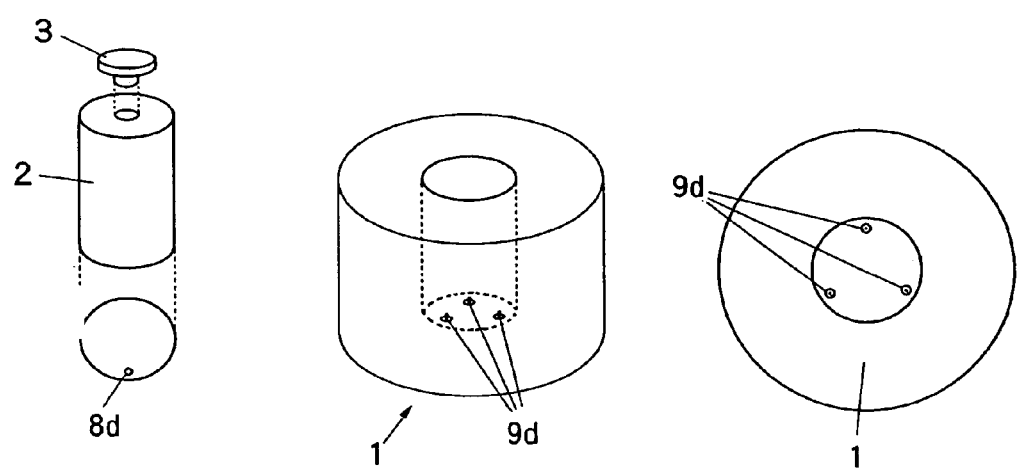

In the example shown in FIG. 2B, a hole 8d for identification is bored at the bottom of the scanner 2 and plural pin switches 9d are provided on the bottom part of the mounting unit 1, and, when the scanner 2 is mounted, engagement between the pin switches 9d and the hole 8d is detected. That is, the pins of the pin switches 9d that have not engaged the hole 8d are pressed by the bottom surface of the scanner 2 to actuate the switches, and only the pin of the engaged pin switch 9d is not made into contact and the switch is not actuated. Thus, the position in which the hole is bored can be detected, and thereby, the scanner of interest can be identified. The number of pins is shown as three in FIG. 2B, however, it is not limited to this number, and the number of the required pins is equal to the number of the used scanners. In this example 4, similarly, in the information storage mode by the hole position, parameter information specific to the scanner of interest can not be directly stored. Therefore, a system in which parameter information specific to the respective scanners corresponding to IDs has been stored in storage means such as a ROM provided on the SPM main body side in advance, and the parameter information specific to the scanner of interest is read out according to the read ID and set in the controller is adopted.

As a modified example of the embodiment 4, there is a system in which an ID is identified by a combination of plural pin switches 9d and an indefinite number of holes 8d. For example, when using two pin switches 9d, there are four different cases, a first case where there is no hole, a second case where there is a hole in which a first pin engages but a second pin does not engage, a third case where the first pin does not engage and a hole is present in which the second pin engages, and a fourth case where there are two holes to engage both pins. By the way, generally, of there are n pins, $2^n$ kinds of identification can be performed.

As described above, in the invention, in the SPM in which a plurality of scanners are used, the SPM has only to automatically identify which scanner is set in the mounting unit. In addition, different variations are conceivable.

Since the scanning probe microscope of the invention includes means for representing information on a scanner in a part of the scanner, and means for interpreting the information and means for setting, in the controller, parameter information specific to the scanner of interest based on the interpreted information on the main body side on which the scanner is mounted, when the used scanner is selected and replaced according to the use condition, the replacement is discriminated on the SPM main body side and the parameters of the used scanner are automatically set in the controller. Therefore, complex works such as manual setting by the operator as in the conventional one are dispensed with, and the operation error can be avoided and accurate measurement can be executed.

The scanning probe microscope of the invention uses a mark such as a barcode, a position of a notch or hole for identifying the scanner as the means for representing information on a scanner, mark reading means such as a barcode reader, a push pin, and a photo-sensor as the means for interpreting the information, and means having a member for storing parameter information of the scanner identified by the mark while associating the parameter information with the mark information, and means for reading out the parameter information from the storage member and means for setting, in the controller, parameter information specific to the scanner of interest based on the interpreted information. By this simple constitution using no complex member, complex tasks such as manual setting by the operator as in the conventional SPM are dispensed with, and operational errors can be avoided and accurate measurements can be realized.

The scanning probe microscope of the invention uses an IC chip or a barcode that has stored parameter information specific to the scanner of interest as the means for representing information on a scanner, information reading means such as a reading head or a barcode reader as the means for interpreting the information, and the means for setting, in the controller, the parameter information specific to the scanner of interest based on the interpreted in information. By such simple constitution using no complex member, complex tasks such as manual setting by the operator as in the conventional one are dispensed with, and operational errors can be avoided and accurate measurements can be realized.

In the scanning probe microscope of the invention using an IC chip having a function of wireless transmission as the means for representing information on a scanner, and means for receiving the wireless transmitted information as the mans for interpreting the information, all of the necessary information can be directly stored by using the IC chip as a storage element having a large capacity. It is unnecessary for the controller connected to the SPM main body to have stored the parameter information specific to the respective scanners corresponding to IDs in a storage medium such as a ROM. The desired objective can be realized by this simple system.

What is claimed is:

1. A scanning probe microscope comprising: a scanner; representing means disposed on a part of the scanner for representing preselected information corresponding to the scanner; a mounting unit for supporting the scanner, the mounting unit having interpreting means for interpreting the preselected information represented by the representing means; and setting means for setting in a controller for controlling the scanning probe microscope parameter information corresponding to the scanner in accordance with the preselected information interpreted by the interpreting means.

2. A scanning probe microscope according to claim 1; wherein the representing means comprises an identifying mark.

3. A scanning probe microscope according to claim 1; wherein the representing means comprises an IC chip containing the parameter information corresponding to the scanner.

4. A scanning probe microscope according to claim 1; wherein the representing means comprises an IC chip containing the parameter information corresponding to the scanner, the IC chip including means for transmitting the parameter information by wireless transmission; and wherein the interpreting means includes means for receiving the parameter information transmitted by the IC chip by wireless transmission.

5. A scanning probe microscope according to claim 2; wherein the identifying mark comprises a barcode.

6. A scanning probe microscope according to claim 2; wherein the identifying mark comprises a notch portion formed on the scanner.

7. A scanning probe microscope according to claim 2; wherein the identifying mark comprises a hole formed in a portion of the scanner.

8. A scanning probe microscope according to claim 2; wherein the interpreting means comprises reading means for reading the identifying mark.

9. A scanning probe microscope according to claim 8; wherein the reading means comprises a barcode reader.

10. A scanning probe microscope according to claim 8; wherein the reading means comprises a photosensor.

11. A scanning probe microscope according to claim 2; wherein the setting means comprises a storage member for storing the parameter information of the scanner represented by the identifying mark, and reading means for reading the parameter information stored in the storage member.

12. A scanning probe microscope according to claim 3; wherein the interpreting means comprises a reading head for reading the parameter information contained in the IC chip; and wherein the setting means includes means for setting in the controller the parameter information read by the reading head.

13. A scanning probe microscope according to claim 1; wherein the representing means comprises a barcode containing the parameter information corresponding to the scanner.

14. A scanning probe microscope according to claim 13; wherein the interpreting means comprises a barcode reader for reading the parameter information contained in the barcode; and wherein the setting means includes means for setting in the controller the parameter information read by the barcode reader.

15. A scanning probe microscope comprising: a scanner; an identifying member mounted on the scanner and containing identification information corresponding to the scanner; and a mounting unit for supporting the scanner, the mounting unit having reading means for reading the identification information contained in the identifying member when the scanner is supported by the mounting unit.

16. A scanning probe microscope according to claim 15; wherein the identification member comprises a barcode disposed on an external surface of the scanner and containing the identification information; and wherein the reading means comprises a barcode reader for reading the identification information contained in the barcode.

17. A scanning probe microscope according to claim 15; wherein the identification member comprises an IC chip mounted on the scanner and containing the identification information; and wherein the reading means comprises a reading head mounted on the mounting unit for reading the identification information.

18. A scanning probe microscope according to claim 15; wherein the identification member comprises an IC chip having a wireless transmission circuit for transmitting the identification information by wireless transmission; and wherein the reading means comprises a wireless receiving circuit for receiving the identification information by wireless transmission.

19. In combination: a scanning probe microscope for removably housing a scanner selected from a plurality of scanners and a controller for controlling operation of the scanning probe microscope, the improvement comprising: a plurality of identifying members mounted on the respective scanners and containing identification information corresponding to the respective scanners; a mounting unit for removably supporting a selected one of the scanners, the mounting unit having reading means for reading the identification information contained in the identifying member when the selected scanner is supported by the mounting unit; and setting means for setting the identification information corresponding to the selected scanner to the controller to provide operating parameters corresponding to the identification information for operating the scanning probe microscope.

20. A combination according to claim 19; wherein each of the identifying members comprises a barcode containing the identification information and being disposed on an outer surface of the corresponding scanner; and wherein the reading means of the mounting unit comprises a barcode reader for reading the identification information contained in the barcode.

* * * * *